No. 786,854. PATENTED APR. 11, 1905.
R. G. STROTHER.
PUMPING JACK FOR OIL WELLS.
APPLICATION FILED MAY 14, 1904.
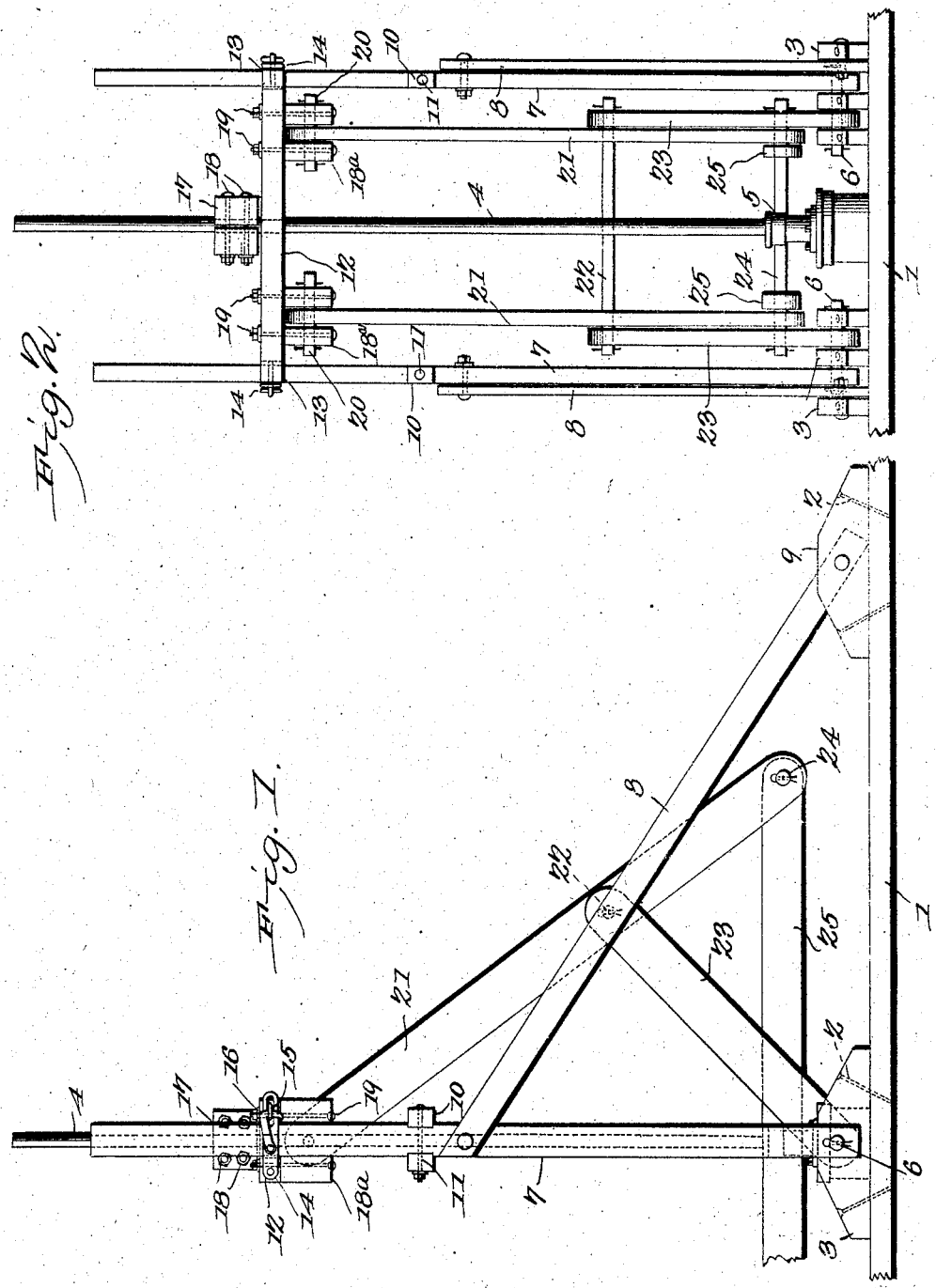
Witnesses
Rolland G. Strother, Inventor.
by C A Snow & Co
Attorneys No. 786,854.	Patented April 11, 1905.

UNITED STATES PATENT OFFICE.

ROLLAND G. STROTHER, OF FINDLAY, OHIO.

PUMPING-JACK FOR OIL-WELLS.

SPECIFICATION forming part of Letters Patent No. 786,854, dated April 11, 1905.

Application filed May 14, 1904. Serial No. 208,033.

*To all whom it may concern:*

Be it known that I, ROLLAND G. STROTHER, a citizen of the United States, residing at Findlay, in the county of Hancock and State of Ohio, have invented a new and useful Pumping-Jack for Oil-Wells, of which the following is a specification.

This invention relates to pumping-jacks for oil-wells.

The objects of the invention are to improve, simplify, and strengthen the construction, increase the efficiency in operation, and reduce the expense of manufacturing such devices.

With these objects in view the invention resides in the novel combination and arrangement of parts and in the details of construction hereinafter described, with reference to the accompanying drawings, forming part of this specification, wherein—

Figure 1 is a side elevation of a pumping-jack constructed in accordance with the invention, and Fig. 2 is a front elevation.

The reference-numeral 1 indicates a suitable platform, which may be arranged above an oil-well in any suitable manner. Fastened upon the platform 1, preferably by means of spikes 2, is a plurality of blocks 3, which are arranged in two sets, one on each side of a polish-rod 4, passing through a suitable stuffing-box 5 in the platform 1. Extending through each of the two sets of blocks 3 is a rod 6, having suitable cross-pins therein to prevent withdrawal. Mounted upon the outer end of each pin 6 is an upright 7, which is steadied and strengthened by a brace 8, fitted into a block 9, attached to the platform 1. Above the braces 8 suitable shoulders or abutments 10 are attached to each upright 7 by means of a bolt 11. Above the shoulders 10 the uprights 7 7 are connected by a cross-piece 12, which is formed at each end with integral projecting arms 13, fitting against the opposite sides of the uprights 7 and connected at their outer ends by hinged links 14, engaging staples 15 and being held thereon by hooks 16. The polish-rod 4 passes through the cross-piece 12 and is made to move therewith by means of a divided adjustable collar 17, the sections of which are clamped together by bolts 18. It will be apparent that the cross-piece 12 is adapted to reciprocate vertically upon the uprights 7 and impart its reciprocation to the polish-rod 4. Should the operating mechanism hereinafter to be described become deranged at any time, the fall of the cross-piece will be stopped by the shoulders or abutment 10, and thus the polish-rod will be prevented from dropping into the well. A plurality of blocks 18ª are attached to the lower surface of the cross-piece 12 by means of bolts 19. The blocks 18 are mounted in two sets, one on each side of the polish-rod, and between the blocks of each set is pivotally mounted, by means of a rod 20, the upper end of an operating-lever 21. Intermediate its ends each of the levers 21 is pivoted, by means of a rod 22, to the upper end of a short lever 23, that is pivotally mounted at its lower end upon the rod 6 in the blocks 3. The lower end of each lever 21 is connected, by means of a rod 24, to a draw rod or rein 25, which is operated by any suitable engine or the like. It will be observed that the rods 22 and 24 connect the levers 21 21 and cause them to operate together.

The operation of the improved pumping-jack will be apparent from the illustration, and further description thereof is thought to be unnecessary.

By pivotally mounting the operating-levers 21 intermediate their ends any lateral strain upon the cross-piece 12 and polish-rod 4 is prevented, and said polish-rod is caused to reciprocate easily and smoothly in a vertical direction, thus preventing wear upon either the rod or the packing in the stuffing-box and requiring only the minimum of power to operate the jack.

The device of the invention is strong, simple and inexpensive in construction, and thoroughly satisfactory in operation. In its novel combination and arrangement of parts and in its details of construction it presents a decided improvement over prior devices of a similar character.

Changes in the precise embodiment of invention illustrated and described may be made within the scope of the following claim without departing from the spirit of the invention.

Having thus described the invention, what is claimed is—

In a device of the class described, a base having a plurality of spaced blocks disposed in two sets in alinement with each other, uprights mounted between and extending upwardly from the outer blocks, inclined braces for said uprights, abutments secured upon the latter, a cross-head engaging the uprights and moving vertically upon the latter, spaced blocks arranged in pairs upon the under side of said cross-head, operating-levers pivotally connected with said blocks, auxiliary levers connected with the operating-levers intermediate the ends of the latter by means of transverse rods, pivotal connecting means between the lower ends of said auxiliary levers and the base-blocks, operating-bars, and a transverse rod connecting the latter with the free ends of the operating-levers.

In testimony that I claim the foregoing as my own I have hereto affixed my signature in the presence of two witnesses.

ROLLAND G. STROTHER.

Witnesses:
E. T. DUNN,
MAUDE M. BOEHMER.